(12) United States Patent
Oogami et al.

(10) Patent No.: US 7,754,379 B2
(45) Date of Patent: Jul. 13, 2010

(54) SECONDARY BATTERY

(75) Inventors: Etuso Oogami, Atsugi (JP); Takeshi Miyamoto, Yokohama (JP); Yuuichi Hara, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1091 days.

(21) Appl. No.: 11/436,882

(22) Filed: May 18, 2006

(65) Prior Publication Data

US 2006/0269840 A1      Nov. 30, 2006

(30) Foreign Application Priority Data

May 19, 2005   (JP)   ............................. 2005-147043

(51) Int. Cl.
*H01M 2/02* (2006.01)
(52) U.S. Cl. .................. 429/178; 429/179; 429/181; 429/161; 429/163
(58) Field of Classification Search .................. 429/181, 429/161, 178, 211, 179, 163, 170, 123, 162
See application file for complete search history.

(56) References Cited

U.S. PATENT DOCUMENTS

2004/0029001 A1*   2/2004   Yamazaki et al. ........... 429/176

FOREIGN PATENT DOCUMENTS

| JP | 2002-203534 | 7/2002 |
|---|---|---|
| JP | 2004-031138 | 1/2004 |

* cited by examiner

*Primary Examiner*—Raymond Alejandro
(74) *Attorney, Agent, or Firm*—Young Basile

(57) ABSTRACT

A secondary battery has a positive electrode plate and a negative electrode plate enclosed within an internal space of a housing. Positive and negative electrode terminals are plate-shaped, are respectively connected to the positive and negative electrode plates and extend externally from the housing at two different portions of the outer edge thereof. The positive electrode terminal has a first part fixedly adjoined to a second part formed of conductive material(s) having a higher tensile strength than those of the first part. The second part is located outside of the internal space, and a first end of the first part extends into the internal space while its second end is fixedly adjoined to the second part. The secondary battery disclosed herein may possess improved longevity and resistance to electrode terminal vibration.

18 Claims, 3 Drawing Sheets

SECONDARY BATTERY

This application claims priority to Japanese Patent Application No. 2005-147043, filed May 19, 2005, the entire content of which is incorporated herein by reference.

TECHNICAL FIELD

The invention relates to a secondary battery for automotive applications.

BACKGROUND

A secondary battery may conventionally be sealed by housing the secondary battery inside an external member, which is comprised of a sheet-shaped member. The external member is sealed by thermal sealing along the outer peripheral edge of the external member. The secondary battery includes an electrode plate within the external member. An electrode terminal of the secondary battery is connected to the electrode plate and conducts from the outer peripheral edge of the external member.

However, because the strength of a positive electrode terminal having this kind of construction is low, a secondary battery may be damaged when housed in an electric automobile due to vibration associated with running the electric automobile. The damage may result from fractures and metal fatigue. In particular, where a group battery (battery module) is formed by connecting companion terminals of a plurality of batteries, the connected strength of the companion terminals may be reduced.

SUMMARY

In general, the invention relates to a secondary battery in which an electrode terminal, which is connected to an electrode plate, conducts from an external member. In particular, an electrode is sealed by a housing in the inner part of the external member. This invention may provide a secondary battery with improved longevity and improved resistance to vibration of the electrode terminals.

A secondary battery is disclosed that provides positive electrode plates and negative electrode plates and an external member that seals and internally houses the positive electrode plates and the negative electrode plates. By respectively connecting to the positive electrode plates and the negative electrode plates, there is provided a positive electrode terminal and a negative electrode terminal of plate shapes that conduct to the outside from the outer peripheral edge of the external member.

The positive electrode terminal has a first part and a second part constructed from conductive material that has a higher strength than the first part. The second part is arranged at a position on the conductive direction side at the positive electrode terminal. At least one part of the first part is arranged at a location within the battery by the second part at the positive electrode terminal.

This invention provides, at the secondary battery's positive electrode terminal, a first part and a second part comprised of conductive materials that have a greater tensile strength than the first part. At the positive electrode terminal, the second part is positioned at a site on the conductive direction side. Also at the positive electrode terminal, at least one part of the first part is positioned at a site within the battery by the second portion.

Establishing at least one part of this first part at a location on the battery's inner side at the positive electrode terminal may prevent discharge of impurities to the battery's internal section and improve battery longevity. In addition, by establishing a second portion constructed from materials of greater strength than the first part, it is possible to increase the tensile strength of the positive electrode terminal. It is also possible to increase the vibration resistance of the electrode terminal.

In one embodiment, a secondary battery comprises a positive electrode plate and a negative electrode plate. The secondary battery further comprises an external member that houses the positive electrode plate and the negative electrode plate. The secondary battery also includes a plate-shaped positive electrode terminal and a plate-shaped negative electrode terminal, wherein the positive and negative electrode terminals are respectively connected to the positive electrode plate and negative electrode plate. The positive electrode terminal and the negative electrode terminal each conduct to the outside of the external member from a respective outer edge of the external member. The positive electrode terminal includes a first part and a second part, wherein the second part is formed of a conductive material of higher tensile strength compared to a material from which the first part is formed. The second part is arranged at a location in a conduction direction at the positive electrode terminal with respect to at least one portion of the first part.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
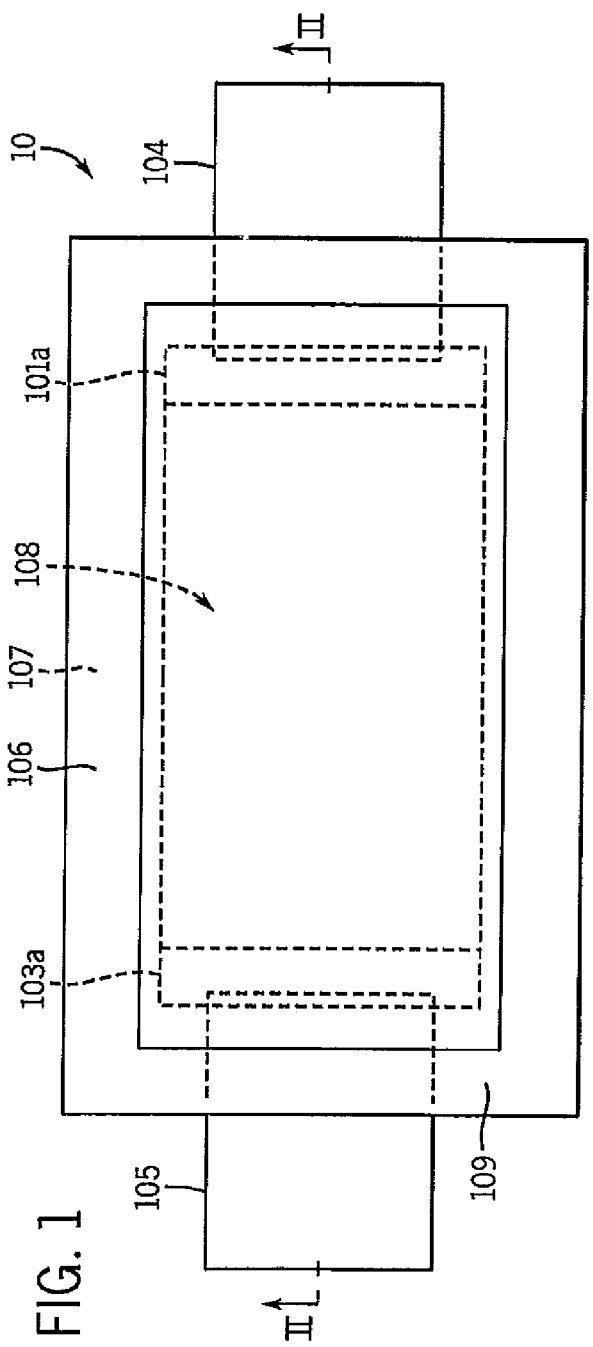
FIG. 1 is a plane view which shows the entire thin-type battery which is related to Embodiment 1 of this invention.
Figure 2:
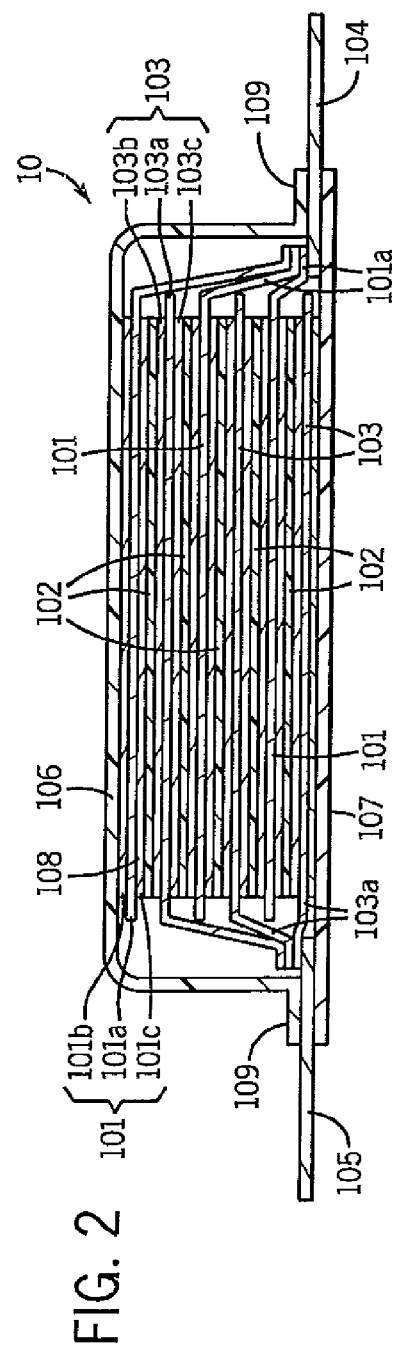
FIG. 2 is a cross-sectional view along the II-II line of FIG. 1.

FIG. 1 is a plane view which shows the entire thin-type battery of Embodiment 1 of this invention. FIG. 2 is a cross-sectional view along the II-II line of FIG. 1. FIG. 1 and FIG. 2 show one thin type battery 10 (simple battery) and a group of batteries (battery module) with a specific voltage and capacity that is formed by multiple laminations of thin type battery 10.

The thin type battery 10 of Embodiment 1 of this invention is a secondary battery of the lithium series. This thin type battery 10, as shown in FIG. 1 and FIG. 2, is formed from three positive electrode plates 101, five separators 102, three negative electrode plates 103, a positive electrode terminal 104, a negative electrode terminal 105, an upper external member 106, a lower external member 107, and especially an electrolyte (not shown). Among these, the generator elements 108 are the positive electrode plates 101, separators 102, and negative electrode plates 103. In some embodiments, generator elements 108 may be essential elements.

The positive electrode plates 101 that form the generator elements 108 have a positive electrode side collector 101a, which extends to the positive electrode terminal 104, and layers of positive electrode active material 101b, 101c, which are respectively formed on both principal, opposing surfaces of part of this positive electrode side collector 101a. The positive electrode side collector 101a is formed by metal leaves that are electrochemically stable such as, for example, aluminum leaf, aluminum alloy leaf, copper leaf, or nickel leaf.

The positive electrode active material 101b and 101c is coated on both principal surfaces of part of the positive electrode side collector 101a with a mixture of conductors such as carbon black and adhesives such as a polytetra fluorine ethylene aqueous dispersion, and is formed by drying and extension. There can be cited compounds for the positive electrode's activity properties. For example, there are the compounds of nickel acid lithium ($LiNiO_2$), lithium manganate ($LiMnO_2$), or cobalt acid lithium ($LiCoO_2$) or chalcogen compounds (S, Se, Te).

The negative electrode plates 103 that form the generator elements 108 have a negative electrode side collector 103a, which extends until the negative electrode terminal 105, and layers of negative electrode active material 103b and 103c, which are respectively formed on both principal, opposing surfaces of part of this negative electrode side collector 103a.

The negative electrode side collector 103a is formed by, for example, nickel leaf, copper leaf, stainless steel leaf or iron leaf, all of which are representative of metal leaves that are electro-chemically stable.

For the negative electrode active material 103b and 103c, mix a hydrophilic dispersion of styrene butadiene gum as the precursor of the organic sintered body with the negative electrode active material, which absorbs and discharges lithium ions of the positive electrode substance. After drying, grind, and with what supports the styrene butadiene gum that carbonized on the carbon particle's surface as the principal material, further mix an adhesive, such as alkyl resin emulsion and the like, and coat this mixture on both surfaces of part of the negative electrode side collector 103a. By drying and extending, form the negative electrode active material 103b and 103c. For a specific negative electrode active material, there can be cited non-crystalline carbon, hard graphitized carbon, flexible graphitized carbon, or graphite.

Especially, amorphous carbon or hard graphization carbon may be used as the negative electrode active material, because there is also a reduction in the output voltage following a slight discharge due to the evenness property of the potential during charging. With the power that communications equipment or office equipment require, the arrangement may prove unsuitable. There is an advantage as the power source for electric automobiles because there is no rapid output reduction.

The separators 102 for the generator elements 108 each prevents a short circuit between the positive electrode plate 101 and negative electrode plate 103, and may provide a mechanism that maintains the electrolyte. This separator 102 is a porous membrane formed from polyolefins, for example, polyethylene (PE) or polypropylene (PP), and when excessive current is flowing, the separator 102 has a function that blocks currents, as holes of the layer have been closed by heat.

Moreover, the separator 102 in this invention is not limited to only a simple layer membrane such as polyolefin. It is possible to use lamination of 3-layered structures that have sandwiched polypropylene membranes using polyethylene membranes or polyolefin porous membranes and organic non-woven sheets. In this way, by using multiple layers of separators, it is possible to impart various functions such as a prevention function for excess current, a maintenance function for the electrolyte and a function that maintains the form of the separator (improves rigidity).

For the generator elements 108, the positive electrode 101, the negative electrode 103, and separator 102 are stacked. Whereas the 3-layer positive electrode plate 101 is connected respectively to the positive electrode terminal 104 by means of the positive electrode side collector 101a, the 3 layer negative electrode plate 103 is respectively connected to the negative electrode terminal 105 by means of the negative electrode side collector 103a.

Moreover, the number of sheets of the positive electrode plate, separator, and negative electrode plate that form the generator elements is not restricted to the number mentioned above for this invention. For example, it is possible to form a generator element using one sheet of the positive electrode plate, three sheets of separator, and one sheet of the negative electrode plate. As necessary, it is possible to form a generator element by selecting the number of sheets of the positive electrode plate, separator, and negative electrode plate.

Figure 3A:
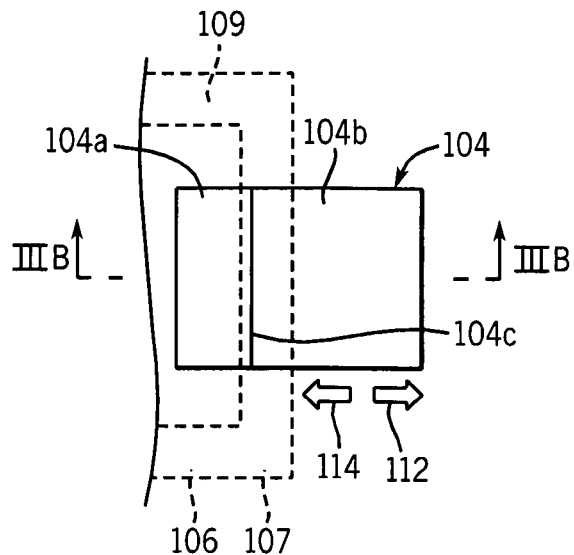
FIG. 3A is an expanded plane view which shows the positive electrode terminal of the thin-type battery which is related to Embodiment 1 of this invention.
Figure 3B:
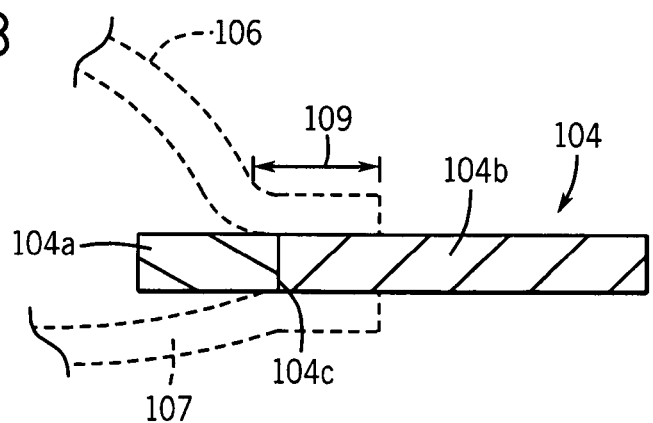
FIG. 3B is a cross-sectional view along the IIIB-IIIB line of FIG. 3A.

The positive electrode terminal 104 of the thin-type battery 10, which was related to this embodiment, is formed from, as shown in FIG. 3A and FIG. 3B, the first part 104a comprised all of highly pure aluminum and a second part 104b comprised of stronger metal materials compared to the first part 104a. The positive electrode terminal 104 may be plate-shaped.

The highly pure aluminum that forms the first part 104a may be of aluminum purity 99.99% or more, and specifically, it is possible to cite AlN (aluminum purity 99.90% or more) or AlN99 (aluminum purity 99.99% or more). Incidentally, an aluminum that forms conventional positive electrode terminals can be used, such as AlN30 (aluminum purity: 99.30% or more).

The second part 104b is formed from metal material that has a greater tensile strength than the highly pure aluminum that forms the first part 104a. It is possible to use, for the metal material that forms the second part 104b, aluminum alloys such as the 3000 series alloy or the 5000 series alloy or copper, or nickel or iron. It is desirable that the high strength materials that form this second part 104b be identical to the metal materials that form the negative electrode terminal 105. When there are series or parallel connections of the plurality of thin-type batteries 10 by this structure, it is easy to connect companion electrode terminals 104 and 105.

FIG. 3A is an expanded plane view that shows the plate-shaped positive electrode terminal of the thin-type battery related to Embodiment 1 of this invention. FIG. 3B is a cross-sectional view along the IIIB-IIIB line of FIG. 3A. This second part 104b, as shown in FIG. 3A and FIG. 3B, is arranged at the location of the conduction side at the positive electrode terminal 104. With respect to this, the first part 104a is arranged at a location within the battery compared to the second location 104b, which is at the positive electrode terminal 104. Moreover, for this embodiment, "conduction direction" indicates the direction 112 in which the positive electrode terminal 104 is conducting from outside members 106 and 107. "Battery inner side" indicates the direction 114 directed to the interior of the secondary battery 10, that is, indicating the direction opposite to that of the conduction direction.

The first part 104a and the second part 104b, as shown in FIG. 3B, project and combine and serve as companions. For example, there is welding by using the friction stir welding (FSW) method.

As for the positive electrode terminal 104 formed in this way, as shown in FIG. 3B, the boundary 104c between the first part 104a and the second part 104b is situated between the two sheets of the heat sealing, or thermal sealed, part 109 (later described) of the external members 106 and 107. There is heat sealing to the external members 106 and 107. From the structure, it is possible to elevate the tensile strength of the portion that requires special strength during vibration input at the positive electrode terminal 104. In addition, in the positive electrode terminal 104, because only first part 104a projects between the internal space of the external members 106 and 107, and because only first part 104a is immersed in the electrolyte solution of the battery, melting of impure materials in the electrolyte solution may be prevented. The positive electrode terminal 104 may have a substantially uniform thickness.

The negative electrode terminal 105, in the same way as with the above described negative electrode side collector 103a, is constructed, for example, using metal materials that are electrochemically stable such as nickel leaf, copper leaf, stainless steel leaf, styrene leaf or iron leaf. The negative electrode terminal 105 is a plate-shaped member and may have thickness of 0.5 mm.

Moreover, in this embodiment, by extending until the electrode terminals 104 and 105 of metal leafs body which forms the collectors 101a and 103a, and with the direct connections of the electrode plates 101 and 103 to the electrode terminals 104 and 105, it is desirable to connect to the electrode plates 101 and 103 and the electrode terminals 104 and 105 by separate members or products as metal leaves which form the collectors 101a and 103a.

The generator elements 108 are sealed by storing them in the upper part of the external member 106 and the lower part of the external member 107. The upper part external member 106 and upper part external member 107 for this embodiment can be anything, and especially, although not shown, there is construction from members of flexible sheets of a laminated material for the resin-metal thin membrane. This sheet shaped member is formed by laminating to the outside from the thin type battery 10 the three layers of the inside resin layer, the metal layer, and the outside resin layer.

The inside resin layer that forms this sheet shaped member is formed by resident films that have superior electrolyte resistance and heat sealing such as polyethylene, denatured polyethylene, polypropylene, and denatured polypropylene. In addition, the metal layer is formed using metal leaf such as, for example, aluminum. The outside resin layer is formed using a resin film that is a superior electrical insulator such as, for example, polyamide series resins or polyester series resins.

Moreover, as shown in FIG. 1 and FIG. 2, because the electrode terminals 104 and 105 are conducting from the sealed external members 106 and 107, and because the sealability of the thin type battery 10 is maintained, at the part where there is contact between the electrode terminals 104 and 105 and the external members 106 and 107, it is good to have a seal film that was constructed from a polyethylene or polypropylene. This seal film can even be the positive electrode terminal 104 and the negative electrode terminal 105. It is preferable from the perspective of the heat sealing that such a sealing film be constructed using the same system as the synthesized resin material that forms the inside resin layer of the external members 106 and 107.

From these external members 106 and 107, there is insertion of generator elements 108 and one part of the positive electrode terminal 104 and one part of the negative electrode terminal 105. In this space, which is formed by external members 106 and 107, and while injecting a liquid electrolyte as a dissolved substance of lithium salt in an organic solvent for lithium perchloric acid and lithium hexafluorophosphate, and after making a vacuum in the space, there is thermal sealing of the outer edge of the external members 106 and 107 by thermal press to form the thermal sealed part 109. From this construction, there is housing and sealing of the generator elements 108 and one part of the electrode terminals 104 and 105 within the external members 106 and 107.

As for the organic liquid solvent, it is possible to cite the following: propylene carbonate (PC) or ethylene carbonate (EC), dimethylcarbonate (DMC), methylethylcarbonate, all as examples of ester series solvents. Moreover, the organic liquid solvents for this invention are not limited, and ether series solvents such as γ-buthilactone (γ-BL) or diethoxyethane (DEE) and their mixtures with ester series solvents can be used as combined organic liquid solvents.

As described above, with the thin-type battery 10 related to this embodiment, there is a formation using a highly pure aluminum of the first part 104a. By establishing this first part 104a at a location on the inside of the battery at the positive electrode terminal 104, there is prevention of the discharge of impurities towards the inside of the thin-type battery 10, and it is possible to design for long battery life.

In addition, by establishing the second part 104b, which was formed from high purity materials, at a location on the conduction side at the positive electrode terminal 104, it is possible to increase the tensile strength of the positive electrode terminal 104. It is possible to raise the vibration resistance of the electrode terminal.

Figure 4A:
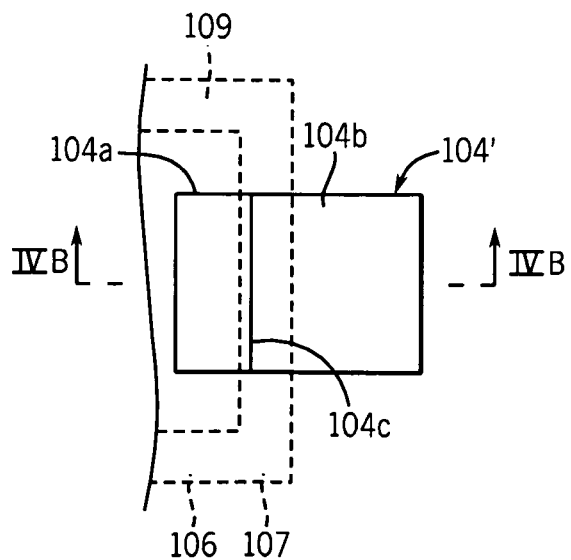
FIG. 4A is an expanded plane view which shows the positive electrode terminal of the thin-type battery which is related to Embodiment 2 of this invention.
Figure 4B:
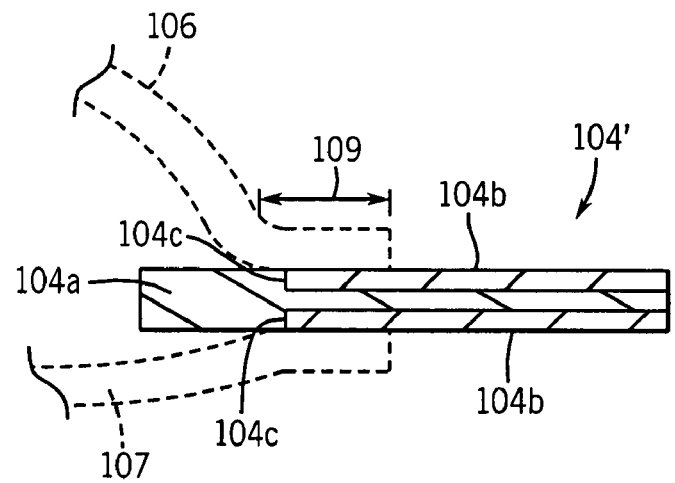
FIG. 4B is a cross-sectional view along the IVB-IVB line of FIG. 4A.

Embodiment 2. FIG. 4A is an expansion plane view that shows the positive electrode terminal of the thin type battery related to Embodiment 2 of this invention. FIG. 4B is a cross-section along the IVB-IVB line of FIG. 4A. The structure of the positive electrode terminal 104' for the thin-type battery related to Embodiment 2 of this invention has difference with the thin-type battery 10 related to the Embodiment 1, but except for these differences, Embodiment 2's battery is the same as the thin-type battery 10 related to Embodiment 1. Below, there's an explanation of the thin-type battery related to Embodiment 2 for only those points of difference with the thin-type battery related to Embodiment 1.

The positive electrode terminal 104' in this embodiment, as shown in FIG. 4A and FIG. 4B, is the same as Embodiment 1, and is formed from the first part 104a, which is comprised of high purity aluminum, and from the second part 104b, which is comprised of metal material of higher strength than the first part 104a.

In this embodiment, there are differences with the first embodiment, as shown in FIG. 4B, as the first part 104a is extended along the entire body of the positive electrode terminal 104' until the end of the conducting direction side from the terminal within the battery. The second part 104b is glued on both principal surfaces at a location on the conduction direction side of the first part 104a. With this positive electrode terminal 104', by rolling so that there is overlap of the second part 104b on both principal surfaces of the first part 104a, the second part 104b is glued to the first part 104a.

With this embodiment, as shown in FIG. 4B, the boundary 104c, which is positioned within the battery, the best boundary between the first part 104a and the second part 104b is in a narrowed state at the external members of and 107 for the thermal sealing part 109 of the external members 106 and 107. From this construction, it is possible to increase the tensile strength of the part which requires strengthening at the time vibration is presented to the positive electrode terminal 104'. In addition, the positive electrode terminal 104', because only the first part 104a projects into the internal space of the external members 106 and 107, has the result that only the first part 104a becomes immersed in the electrolyte liquid within the battery.

With this embodiment, as with the first embodiment, high purity aluminum was used to form the first part 104a, and by establishing one part of this first part 104a at a location within the battery at the positive electrode terminal 104', discharge of impurities towards the inside of the thin-type battery is prevented, and it is possible to design a battery with long life.

In addition, in this embodiment, by establishing the second part 104b, which is formed from high purity materials, at a location in the conduction direction at the positive electrode terminal 104', it is possible to increase the tensile strength of the positive electrode terminal 104' and it is possible to raise the vibration resistance of the electrode terminal.

Furthermore, with this embodiment, in a state where there is superimposed the second part 104b on the principle surfaces of the first part 104a by rolling, because there is contact between the first part 104a and the second part 104b, it may be possible to easily manufacture the positive electrode terminal 104'. Furthermore, it may be possible to easily make uniform the thickness of the positive electrode terminal 104'.

Figure 5A:
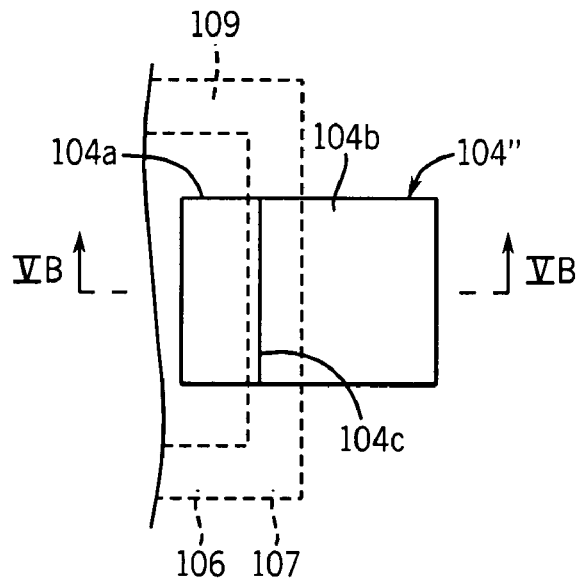
FIG. 5A is an expanded plane view which shows the positive electrode terminal of the thin-type battery which is related to Embodiment 3 of this invention.
Figure 5B:
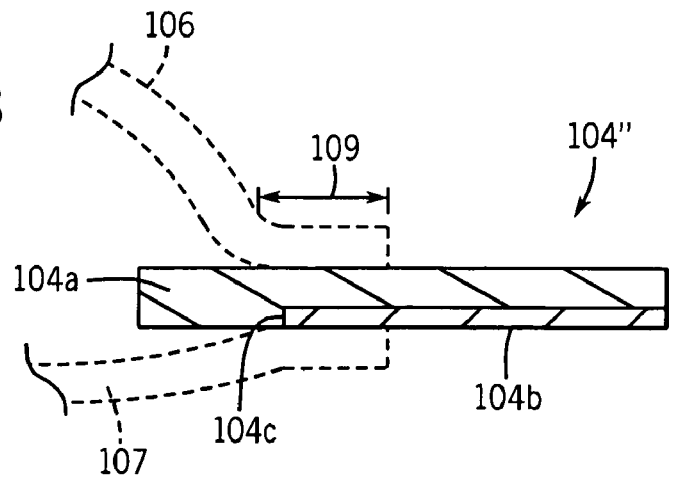
FIG. 5B is a cross-sectional view along the VB-VB line of FIG. 5A.

Third Embodiment. FIG. 5A is an expanded plane view that shows the positive electrode terminal of the thin type battery related to the third embodiment of this invention, and FIG. 5B is a cross-sectional view along the line VB-VB of FIG. 5A. The thin-type battery related to Embodiment 3 of this invention has the structure of the positive electrode terminal 104" and except for differences with the thin-type battery 10, which is related to Embodiment 1, Embodiment 3 is the same as the thin-type battery 10 related to Embodiment 1. Below, there's an explanation of the thin-type battery related to Embodiment 3 for only those points of difference with the thin-type battery related to Embodiment 1.

The positive electrode terminal 104" in this embodiment is the same as the terminal in Embodiment 1 and is formed from the first part 104a, which is comprised of high purity aluminum, and from the second part 104b, which is comprised of metal material of higher strength than the first part 104a.

In this embodiment, there are differences with the first embodiment, as shown in FIG. 5B, and the first part 104a is extended along the entire body of the positive electrode terminal 104" until the end of the conducting direction side from the terminal within the battery.

The second part 104b is attached (e.g., glued) onto a lower principal surface of the first part at a location on the conduction direction side of the first part 104a. With this positive electrode terminal 104", by rolling so that there is overlap of the second part 104b of a principal surface of the first part 104a, the second part 104b is glued to the first part 104a.

With this embodiment, as shown in FIG. 5B, the boundary 104c, which is positioned within the battery, is the best boundary between the first part 104a and the second part 104b and is in a narrowed state at the external members of 106 and 107 at the thermal sealing part 109 of the external members 106 and 107. From this construction, it is possible to increase the tensile strength of the part, which requires strengthening when vibration is presented to the positive electrode terminal 104". In addition, for the positive electrode terminal 104", because only the first part 104a projects into the internal space of the external members 106 and 107, the result is that only the first part 104a becomes immersed in the electrolyte liquid within the battery.

With this embodiment in the same way as with Embodiment 1, high purity aluminum was used to form the first part 104a, and by establishing one part of this first part 104a at a location within the battery at the positive electrode terminal 104", discharge of impurities towards inside the thin-type battery is prevented, and it is possible to design a battery with a long life. In addition, in this embodiment, by establishing the second part 104b, which is formed from high purity materials at a location in the conduction direction at the positive electrode terminal 104", it is possible to increase the tensile strength of the positive electrode terminal 104" and it is possible to raise the vibration resistance of the electrode terminal.

Furthermore, with this embodiment, where there is superimposed the second part 104b on the principle surface of the first part 104a, by rolling these, because there is contact between the first part 104a and the second part 104b, it is possible to easily manufacture the positive electrode terminal 104". Furthermore, it is possible to easily make uniform the thickness of the positive electrode terminal 104".

Moreover, the above explained embodiments are presented so as to easily understand the invention and are not presented to limit the invention. Consequently, every element that is disclosed in the above embodiments contains all the design changes or their equivalents which belong to the technical scope of this invention. For example, in Embodiment 3, there is an explanation of the establishment of the second part 104b on the lower surface of the positive electrode terminal 104", but there are no special limitations which apply to this invention, and it is possible to establish the second part 104b on the upper surface of the positive electrode terminal 104".

Various embodiments of the invention have been described. These and other embodiments are within the scope of the following claims.

The invention claimed is:

1. A secondary battery comprising:
    a positive electrode plate;
    a negative electrode plate;
    a housing enclosing the positive electrode plate and the negative electrode plate within an internal space formed by the housing;
    a positive electrode terminal connected to the positive electrode plate in the interior space of the housing and extending externally from the housing at a first portion of an outer edge of the housing, the positive electrode terminal having a plate shape; and
    a negative electrode terminal connected to the negative electrode plate in the interior space of the housing and extending externally from the housing at a second portion of the outer edge of the housing, the negative electrode having a plate shape; wherein
    the positive electrode terminal includes a first part fixedly adjoined to a second part, wherein the second part is formed of a conductive material of higher tensile strength compared to a conductive material of the first part; and wherein
    the first part has a first end extending into the internal space and an opposed second end fixedly adjoined to the second part, and the second part is spaced apart from the internal space.

2. The secondary battery of claim 1, wherein the housing includes a sealed part formed by sealing two sheet-shaped members along the outer edge of the housing; and wherein at least a portion of a boundary between the first part and the second part is positioned between the two sheet-shaped members at the sealed part.

3. The secondary battery of claim 1, wherein the second part is fixedly adjoined to a surface of the first part that is facing a stacking direction of the positive electrode plate and the negative electrode plate.

4. The secondary battery of claim 1, wherein the positive electrode terminal has a substantially uniform thickness.

5. The secondary battery of claim 1, wherein the conductive material of the second part comprises a same material as the negative electrode terminal.

6. The secondary battery of claim 1, wherein the conductive material of the second part comprises at least one of an aluminum alloy, copper, nickel or iron.

7. The secondary battery of claim 1, wherein the first part is formed of aluminum having an aluminum purity of at least 99.3%.

8. The secondary battery of claim 1, wherein the negative electrode terminal is formed of a material having a greater tensile strength than the conductive material of the first part of the positive electrode terminal.

9. The secondary battery of claim 1, wherein the opposed second end of the first part extends externally from the housing and the second part comprises a layer laminated on at least one of a top or a bottom surface of the opposed second end with respect to a stacking direction of the positive electrode plate and the negative electrode plate.

10. The secondary battery of claim 2, wherein the second part is fixedly adjoined to a surface of the first part that faces a stacking direction of the positive electrode plate and the negative electrode plate.

11. The secondary battery of claim 2, wherein the opposed second end of the first part terminates at the sealed part such that the boundary between the first part and the second part is positioned between the two sheet-shaped members at the sealed part.

12. The secondary battery of claim 11, wherein the first part has substantially a same thickness as the second part.

13. The secondary battery of claim 2, wherein the opposed second end of the first part extends externally from the housing and the second part comprises a layer fixedly adjoined to one of a top or a bottom surface of the opposed second end with respect to a stacking direction of the positive electrode plate and the negative electrode plate.

14. The secondary battery of claim 13, wherein the opposed second end of the first part and the second part together have substantially a same thickness as the first end of the first part.

15. The secondary battery of claim 13, wherein a first end of the second part is located at the sealed part and a second end of the second part is coterminous with the opposed second end of the first part.

16. The secondary battery of claim 2, wherein the opposed second end of the first part extends externally from the housing and the second part comprises a first layer fixedly adjoined a top surface of the opposed second end with respect to a stacking direction of the positive electrode plate and the negative electrode plate and a second layer fixedly adjoined to a bottom surface of the opposed second end with respect to the stacking direction.

17. The secondary battery of claim 16, wherein the opposed second end of the first part and the second part together have substantially a same thickness as the first end of the first part.

18. The secondary battery of claim 16, wherein a first end of each of the first layer and the second layer of the second part is located at the sealed part and second end of each of the first layer and the second layer of the second part is coterminous with the opposed second end of the first part.

* * * * *